United States Patent

Stehlin et al.

[11] Patent Number: 5,494,486
[45] Date of Patent: Feb. 27, 1996

[54] MERCERIZATION WETTING COMPOSITION

[75] Inventors: Albert Stehlin, Rosenau, France; Thomas Maier, Schliengen, Germany

[73] Assignee: Ciba-Geigy Corporation, Tarrytown, N.Y.

[21] Appl. No.: 459,437

[22] Filed: Jun. 2, 1995

Related U.S. Application Data

[62] Division of Ser. No. 287,391, Aug. 8, 1994.

[30] Foreign Application Priority Data

Aug. 10, 1993 [CH] Switzerland .............................. 2376/93

[51] Int. Cl.$^6$ ...................... D06M 11/38; D06M 13/256; D06M 13/328
[52] U.S. Cl. .................... 8/125; 8/127; 252/8.6; 252/87; 252/8.75; 252/8.8; 252/8.9; 428/365; 428/378; 428/393
[58] Field of Search ..................... 8/125, 127; 252/8.8, 252/8.7, 8.75, 8.8, 8.9; 427/394; 428/365, 378, 393

[56] References Cited

U.S. PATENT DOCUMENTS

| | | | |
|---|---|---|---|
| 2,257,183 | 9/1941 | Munz | 8/127 |
| 3,839,318 | 10/1974 | Mansfield | 536/18.6 |
| 4,494,952 | 1/1985 | Abel | 8/125 |

FOREIGN PATENT DOCUMENTS

| | | |
|---|---|---|
| 102930 | 3/1984 | European Pat. Off. . |
| 394848 | 10/1990 | European Pat. Off. . |
| 1361371 | 3/1962 | France . |
| 2523962 | 9/1993 | France . |
| 587583 | 7/1930 | Germany . |
| 734509 | 3/1943 | Germany . |
| 1042525 | 11/1958 | Germany . |
| 3225/75 | 8/1976 | Switzerland . |
| 813516 | 5/1959 | United Kingdom . |
| 1034453 | 6/1966 | United Kingdom . |
| 1536207 | 12/1978 | United Kingdom . |
| 88/01640 | 3/1988 | WIPO . |

*Primary Examiner*—Anthony Green
*Attorney, Agent, or Firm*—Kevin T. Mansfield

[57] ABSTRACT

Mercerization wetting compositions comprising a compound of the formula

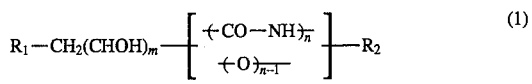

where $R_1$ is hydroxyl or $-SO_3M$, $R_2$ is $C_4-C_{18}$alkyl, M is an alkali metal, n is 0 or 1, and m is from 2 to 6 are described. The mercerization wetting compositions of the invention are high-wetting and low-foaming. Moreover, the compounds are readily biodegradable.

7 Claims, No Drawings

MERCERIZATION WETTING COMPOSITION

This is a division of Ser. No. 08/287,391 filed Aug. 8, 1994.

The present invention relates to carbohydrate-based mercerization wetting compositions for cellulose-containing fibre materials.

Mercerization is a customary step in the processing of cellulose-containing fibre materials and consists in treating these materials with aqueous alkali metal hydroxide.

Mercerization wetting compositions must meet various application requirements. On the one hand, they must develop adequate wetting power in the strongly alkaline mercerizing liquors. Since in high-speed mercerizing machines the material to be mercerized moves through the liquor at high speed, it has to be wetted within a shorter time than is the case in machines working at slower speed. The higher speed of the material to be mercerized is responsible for increasing foaming on the liquor, which for example in yarn mercerization prevents not only rapid but also uniform wetting of the yarn. A further criterion for a good mercerization wetting composition is therefore the prevention of foaming in the mercerizing liquor. Furthermore, the formation of voluminous foam layers also interferes with the concentrating and recovery of the alkali metal hydroxide in the wash baths following the mercerizing bath.

EP-A-0 102 930 discloses mercerization wetting compositions which are based on sulfuric esters of fatty alcohols and which are not only high-wetting but also low-foaming in use. Unfortunately, these wetting compositions are less advantageous from an ecological point of view, since they are slow to biodegrade.

There has now been found mercerization wetting compositions which are based on carbohydrate and which are readily biodegradable and are not only high-wetting but also low-foaming.

The present invention accordingly provides mercerization wetting compositions comprising at least one compound of the formula

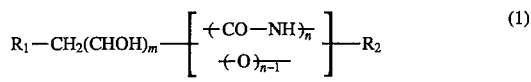

(1)

where $R_1$ is hydroxyl or $-SO_3M$, $R_2$ is $C_4-C_{18}$ alkyl,

M is an alkali metal, m is from 2 to 6, and n is 1 or 0.

The present invention further provides the mercerization liquors containing the mercerization wetting compositions, a process for mercerizing cellulose-containing fibre materials, and a process for reducing foaming in the recovery of alkali metal hydroxide from mercerization wash baths.

The compounds of the formula (1) are alkylglycosides (alkyl ether polyols) when the radical in the square brackets of the formula (1) is $-O-$ (n=0) or alkylcarboxamidoglycosides (alkylglyconamides) when the radical in the square brackets of the formula (1) is $-CO-NH-$ (n=1).

The alkylglycosides/alkylcarboxamidoglycosides used according to the invention are compounds known per se whose preparation has been described in numerous publications. For instance, the preparation of alkylglycosides is described for example in U.S. Pat. No. 3,547,828; U.S. Pat. No. 3,727,269; and U.S. Pat. No. 3,839,318 and the European Patent Applications EP-A-0 301 298; EP-A-0 357 696; and EP-A-0 362 671. The alkylglycoside reaction products can be prepared from compounds of the formula

(1a)

and alcohols of the formula

(1b)

where $R_1$ is hydroxyl or $-SO_3M$, $R_2$ is $C_4-C_{18}$ alkyl, and m is from 2 to 6, either by direct reaction with an excess of the alcohol and in the presence of an acid, for example hydrochloric acid, as catalyst or by transacetalization using a lower alcohol which acts both as solvent and reactant. The alkylglycosides used according to the invention are for example reaction products of the monosaccharides glucose, fructose, mannose, galactose, talose, gulose, allose, altrose, isose, arabinose, xylose, lyxose and ribose and the corresponding $C_4-C_{18}$ alcohols.

The alcohols used advantageously are straight-chain alcohols which are either produced synthetically or which, as fatty alcohols, are as will be known available from natural raw materials. Alcohols of natural origin include for example myristyl alcohol, cetyl alcohol, stearyl alcohol and oleyl alcohol. The synthetic alcohols am primarily alcohols derived from branched hydrocarbons, for example isobutyl alcohol, sec-butanol, tert-butanol, isoamyl alcohol, 2-ethylbutanol, 2-methylpentanol, 5-methylheptan-3-ol, 2-ethylhexanol, 1,1,3,3-tetramethylbutanol, 2-octanol, isononyl alcohol, trimethylhexanol, trimethylnonyl alcohol, n-decanol, $C_9-C_{11}$ oxo alcohol or hexadecyl alcohol. The alcohols can of course also be mixtures. Such mixtures can be derived in particular from the technical grade mixtures of straight-chain $C_4-C_{18}$ alcohols customary in fat chemistry.

The alkylglycosides used according to the invention may, due to their method of synthesis, contain small amounts, preferably below 2% by weight, of unconverted $C_4-C_{18}$ alcohols, which, however, has no disadvantageous effect on their use as mercerization wetting agents.

Alkylcarboxamidoglycosides of the general formula (1) to be used according to the invention are known for example from FR-A-2 523 962. These compounds are prepared for example by reacting an aldonic acid of the formula

(1c)

where $R_1$ is hydroxyl or $-SO_3M$, and m is from 2 to 6, and which may be present in the form of a lactone, with an amine of the formula

(1d)

where $R_2$ is $C_4-C_{18}$ alkyl.

The carboxyl group of the aldonic acid can be activated by means of a carbodiimide, for example dicyclohexylcarbodiimide in an organic solvent. If desired, hydroxybenzotriazole can be used as catalyst. The aldonic acids are used in the preparation of the glycosides (glyconamides) to be used according to the invention in the form of their alkali metal salts, for example as sodium or potassium salts.

The aldonic acids of the formula (1c) are prepared in a conventional manner by oxidation, for example electrochemical oxidation of the corresponding monosaccharides. Examples of suitable aldonic acids of the formula (1c) are gluconic acid, mannonic acid, galactonic acid, lyxonic acid, arabonic acid, xylonic acid, ribon acid, glucoheptonic acid or glucooctonic acid. Suitable for use as amines for preparing the alkylamidoglycosides of the general formula (1) are for example n-octylamine, ten-octylamine, decylamine, dodecylamine, laurylamine, tetradecylamine or myristylamine, hexadecylamine or palmitylamine, and also octadecylamine or stearylamine.

Alkali metal is to be understood as meaning lithium, potassium or preferably sodium.

Preferably, the mercerization wetting compositions usable according to the invention contain at least one alkylcarboxamidoglycoside compound of the formula $$R_1-CH_2(CHOH)_m CO-NH-R_3 \quad (2)$$

where $R_1$ is hydroxyl or $-SO_3M$, $R_3$ is $C_4-C_{10}$ alkyl,

M is an alkali metal, and m is from 2 to 6.

Very particular preference is given to mercerization wetting compositions containing at least one compound of the formula (1) or (2) where m is from 2 to 4.

An alkylglycoside compound present in the mercerization wetting compositions of the invention is preferably a compound of the formula $$R_1-CH_2(CHOH)_m O-R_4, \quad (3)$$

where $R_1$ is hydroxyl or $-SO_3M$, $R_4$ is $C_6-C_{10}$ alkyl,

M is an alkali metal, and m is from 2 to 6.

Of these compounds, preference is in turn given to those in which m is from 2 to 4.

The compounds of the formula (1) are used not only as individual compounds but also as mixtures. Preferred mixtures comprise compounds of the formulae $$NaSO_3-CH_2(CHOH)_{\overline{m_2}}-O-R_5 \text{ and} \quad (4)$$

$$OH-CH_2(CHOH)_{\overline{m_2}}-O-R_6 \quad (5)$$

where $R_5$ is $C_6-C_{10}$ alkyl, $R_6$ is $C_4-C_8$ alkyl, and $m_2$ are, independently of one another, from 2 to 4.

The compound of the formula (5) is in particular butylglycoside.

The mixing ratio of the compounds of the formula (4) to compounds of the formula (5) in mixtures is from 9:1 to 5:5, preferably from 8:2 to 6:4.

The mercerization wetting compositions used according to the invention are preferably used in the form of an aqueous solution. For this purpose, 1–20, preferably 2.5 to 10, g of the aqueous solution are used per litre of the mercerizing liquor.

Mercerization imparts to cellulose fibres for example higher lustre. At the same time, their dye affinity and the breaking strength are improved. These fibres are for this purpose treated with concentrated alkali metal hydroxide solutions (about 22 to 28%), for example aqueous solutions of lithium, sodium or potassium hydroxide or mixtures of these hydroxides. In the process, the fibres can be subjected to a simultaneous drawing step, which makes it possible to achieve a further increase in the lustre effect. The most frequently employed variant is cold mercerization (in contradistinction to hot mercerization, which is carried out at a bath temperature of 20–80° C.). In cold mercerization, the bath temperature is from about −20 to +20° C. Special effects, for example transparency effects, can be obtained by using baths cooled down to −20° C. Preferably, however, the temperature is 5° to 20° C. Depending on whether the fibres are mercerized in the dry, prescoured or prewetted state, the mercerization is known as dry or wet mercerization. Especially the variant of dry mercerization understandably makes the use of highly effective mercerization wetting compositions necessary.

A further positive property of the mercerization wetting compositions of the invention is their ability to bind iron ions present in the alkali metal hydroxide solutions of the mercerizing liquors. The mercerization wetting compositions of the invention have a high iron-binding capacity, which has the advantage that the additional use of appropriate complexing agents in the mercerizing liquor can be dispensed with.

Suitable cellulose-containing fibre materials are in particular cotton and blend fabrics with regenerated celluloses, such as staple viscose and filament viscose. However, the mercerization of blend fabrics composed of native celluloses (e.g. cotton and also hemp and flax) and regenerated celluloses places high demands on the concentration and composition of the mercerizing liquors owing to the opposing properties of these components. This is why a blend fabric is almost exclusively mercerized dry, thereby avoiding an additional (critical) contact of the blend fabric with scouring or wetting baths.

In industry, mercerization is carried out as yarn or piece mercerization. A detailed description of these process variants and also of mercerization in general is given for example in Lindner, Textilhilfsmittel und Waschrohstoffe, Wissenschaftliche Verlagsgesellschaft, Stuttgart, 1964, Volume 2, pages 1474 ff.

However, mercerization wetting compositions of the invention also permit a rapid and trouble-free recovery of the alkali metal hydroxide from the wash baths following the mercerizing bath. In the course of distillative removal of water from these baths to concentrate the alkali metal hydroxide to the alkali metal hydroxide content of the mercerizing bath, these mercerization wetting compositions have only a very minimal tendency to form a foam. The concentrated alkali metal hydroxide solution obtained can then be re-used in the mercerizing bath.

The Examples which follow illustrate the invention without limiting it thereto. Parts and percentages are by weight, unless otherwise stated.

EXAMPLES 1 to 4

These Examples are concerned with determining the shrinkage capacity of cotton in mercerizing baths in accordance with German Standard Specification DIN 53987. The shrinkage capacity is by definition the time which is required to shrink the cotton yarn immersed in the mercerizing liquor by a certain proportion of its original length. For this, a skein of scoured raw cotton yarn (weight: 1 g; length: 24 cm) to which a weight of 33 g has been attached is dipped into a glass cylinder filled with the alkaline mercerizing solution. What is measured is the time required for the hank to shrink by 20% in the alkali metal hydroxide solution of 30° Bé(30°

Bé corresponds a liquor containing 23.5 g of 100% NaOH in 100 g of liquor). The results are reported in Table 1.

TABLE 1

| Example | Comp. No. | | Concentration [g/l] | Shrinkage capacity [s] |
|---|---|---|---|---|
| 1 | (101) | NaSO₃—CH(OH)—CH(OH)—CH(OH)—CH₂—O—hexyl | 6 | 13 |
| 2 | (101) + (102) | Solution of 32.4% of butyl glycoside in butanol | 3.6 / 2.4 | 5 |
| 3 | (103) | HO—CH₂—CH(OH)—CH(OH)—CH(OH)—CH(OH)—C(O)—HN—CH₂CH(C₂H₅)(CH₂)₃CH₃ | 6 | 15 |
| 4 | (103) + (102) | | 4.8 / 1.2 | 9 |

In addition to the compounds of the formulae (101) to (103), it is also possible to use the following compounds:

$$R_1-CH_2(CHOH)_m-A-NH-R_2$$

| Compound of formula | $R_1$ | $R_2$ | A | m |
|---|---|---|---|---|
| (104) | NaSO₃ | (CH₂)₅CH₃ | —(CO)NH— | 4 |
| (105) | NaSO₃ | (CH₂)₇CH₃ | —(CONH)— | 4 |
| (106) | NaSO₃ | —(CH₂)₉CH₃ | —(CONH)— | 4 |
| (107) | NaSO₃ | —(CH₂)₅CH₃ | —O— | 3 |
| (108) | NaSO₃ | —(CH₂)₃CH₃ | —O— | 3 |
| (109) | NaSO₃ | —(CH₂)₅CH₃ | —O— | 3 |
| (110) | NaSO₃ | —(CH₂)₇CH₃ | —O— | 3 |
| (111) | NaSO₃ | —(CH₂)₉CH₃ | —O— | 3 |
| (112) | OH | —CH₂CH(CH₂CH₃)—(CH₂)₃CH₃ | —(CO)NH— | 4 |
| (113) | NaSO₃ | —CH₂CH(CH₂CH₃)—(CH₂)₃CH₃ | —(CO)—NH— | 3 |
| (114) | OH | —CH₂CH(CH₂CH₃)—(CH₂)₃CH₃ | —(CO)NH— | 3 |

EXAMPLE 5

Determination of the iron-binding capacity [mg of Fe/g]

0.1 g of the compound of the formula (101) are dissolved in about 19 g of water and admixed, in a test series, with an increasing amount of a 1M FeCl₃ solution in steps of 0.1 ml each. The baths are then made up to 100 g with 80 g of 29.375% NaOH solution. The iron-binding capacity of the compound of the formula (101) is 110 mg of iron/g. The compound of the formula (103) gives an iron-binding capacity of 170 mg of iron/g when used in place of the compound of the formula (101).

EXAMPLE 6

Degradability as per OECD method 302 B:

A mixture containing the test substance, mineral nutrients and a relatively high proportion of activated soil sediment is stirred in an aqueous medium and aerated for 28 days at 20° to 25° C. in the dark or in diffuse light. Blank tests are carried out in parallel with the activated soil sediment and the minerals but not the test substance. The process of biodegradation is usually measured daily or at certain time intervals by determining DOC or COD on filtered samples. The OECD value, expressed in percent, is the ratio of eliminated DOC (or COD) to the initial DOC, corrected for the blank sample after each measured time interval.

The compounds of the invention were found to give the following OECD values:

| | |
|---|---|
| Compound of the formula (101): | 56% after 13 days |
| Compound of the formula (103): | 98% after 15 days. |

What is claimed is:

1. A process for mercerizing cellulose-containing fiber materials which comprises treating said materials in an aqueous bath with a mercerization wetting composition comprising (a) at least one compound of the formula $$R_1-CH_2(CHOH)_m CO-NH-R_3 \quad (2)$$

or at least one compound of the formula $$R_1-CH_2(CHOH)_m O-R_4 \quad (3)$$

where
   $R_1$ is hydroxyl or —SO₃M,
   $R_3$ is C₄–C₁₀alkyl,
   $R_4$ is C₆–C₁₀alkyl,
   M is an alkali metal and
   m is from 2 to 6, (b) an alkali metal hydroxide solution and
   (c) water to make up 100% by weight, wherein component (a) is present in a concentration of 1–20 g per liter and component (b) in a concentration of 22–28% by weight.

2. A process according to claim 1, wherein m is from 2 to 4 in the formula (2) or (3).

3. A process according to claim 1, wherein a mixture of the compounds of the formulae (2) and (3) is employed.

4. A process according to claim 3, wherein a mixture of the compounds of the formulae $$NaSO_3-CH_2(CHOH)_{\overline{m_2}}-O-R_4 \text{ and} \quad (4)$$

$$OH-CH_2(CHOH)_{\overline{m_2}}-O-R_5 \quad (5)$$

where $R_4$ is $C_6$–$C_{10}$alkyl, $R_5$ $C_4$–$C_8$alkyl, and $m_2$ is from 2 to 4 is employed.

5. A process according to claim 4, wherein formula (5) signifies butylglycoside.

6. A process according to claim 4, wherein the ratio between the compounds of the formula (4) and the compounds of the formula (5) is from 8:2 to 6:4.

7. A cellulose-containing fibre material mercerized by the process according to claim 1.

* * * * *